Patented June 15, 1954

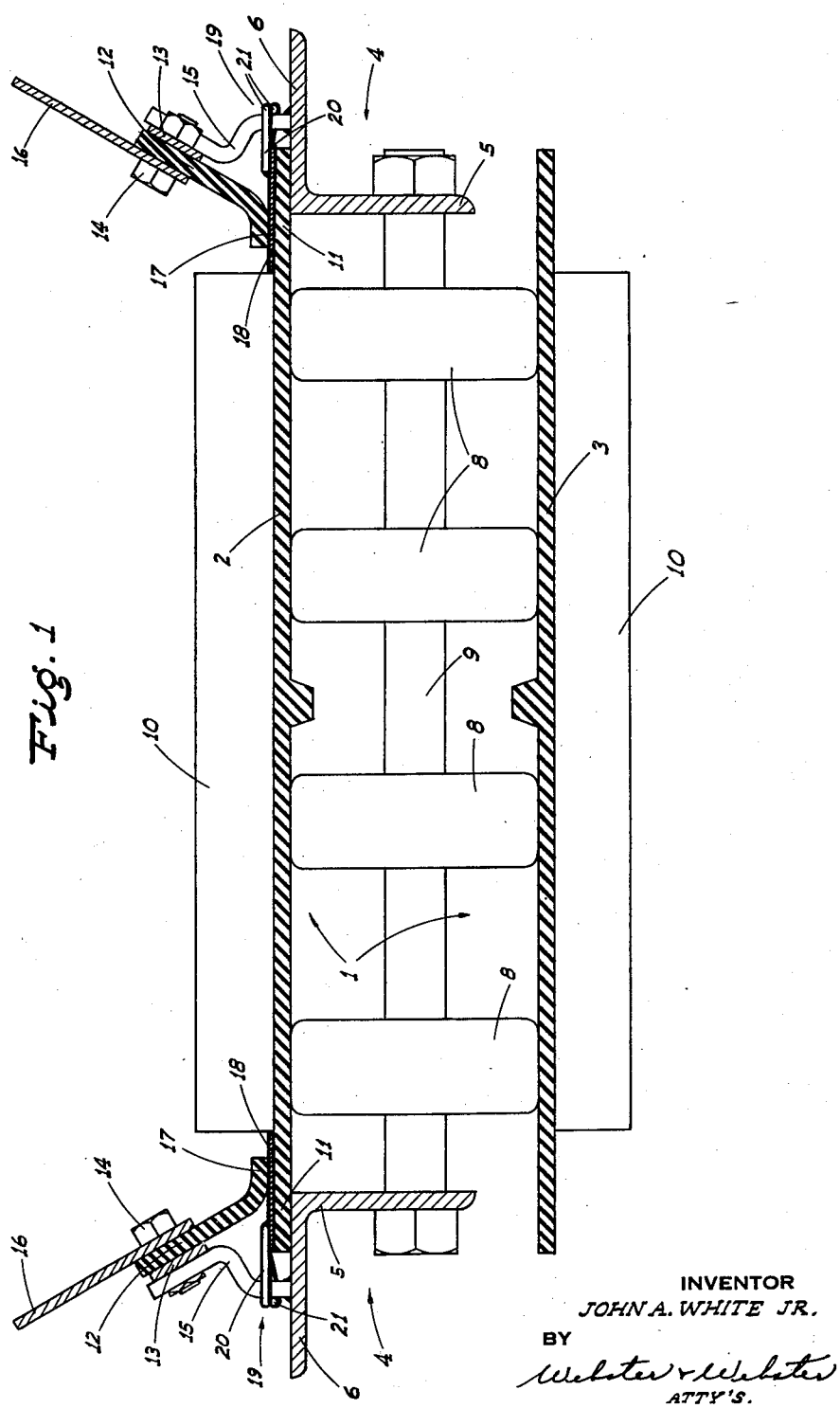

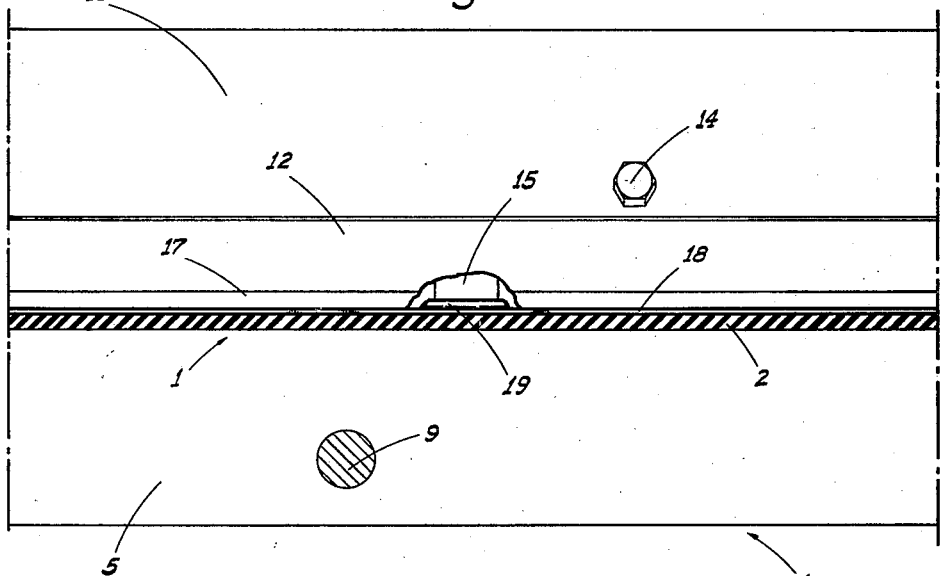
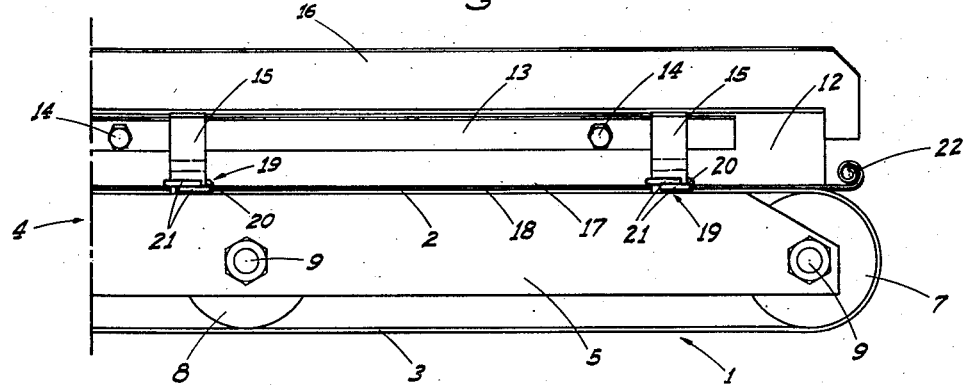
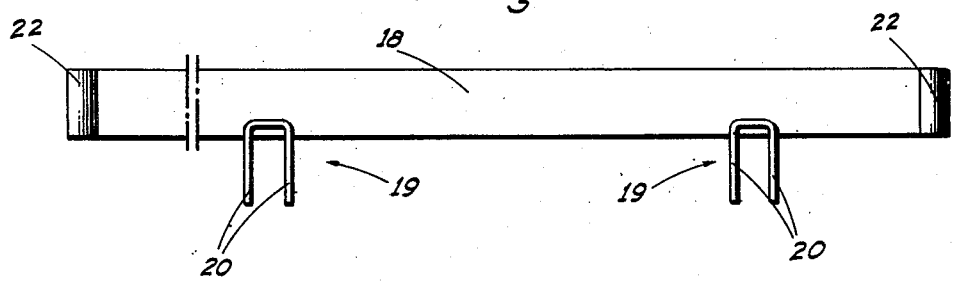

2,681,134

UNITED STATES PATENT OFFICE 2,681,134

CONVEYER ASSEMBLY

John A. White, Jr., Gilroy, Calif., assignor to Be-Ge Manufacturing Co., Gilroy, Calif., a corporation of California Application August 4, 1952, Serial No. 302,467

6 Claims. (Cl. 198—204)

This invention relates in general to driven endless belt material conveyors, especially of the type employed to convey earth as in a ditch digger, wagon loader, or the like.

Conveyors of this type commonly include an endless conveyor belt of rubber, with upwardly and outwardly diverging side skirts of rubber; the latter being disposed above, and at their lower edges having wiping contact with, the outer edge portions of the upper run of the endless belt conveyor. The result, especially when abrasive material is being conveyed, is that undue friction heating and wear occurs between the side skirts and the endless belt. As a consequence, endless belts—in conveyors of the type described—are of limited life, which reflects itself in relatively high operating or maintenance costs.

It is therefore the major object of this invention to provide a novel device, interposed between the rubber side skirts and the upper run of the rubber endless belt, which acts to resist or minimize the wear between the adjacent portions of said side skirts and endless belt.

Another important object of the invention is to provide an endless belt conveyor assembly wherein the wear resisting device, as in the previous paragraph, comprises a flat, longitudinal strip of metal interposed between each longitudinal side skirt and the top surface of the corresponding edge portion of the upper run of the endless belt.

An additional object of the invention is to provide novel connecting or retention means for each of the metallic strips interposed between the side skirts and endless belt; such connecting means being capable of ready attachment in the conveyor assembly, and without limited vertical floating of said strip with the upper run of the endless belt.

A further object of the invention is to provide wear resisting strips, for use in a conveyor assembly, which are designed for ease and economy of manufacture.

A still further object of the invention is to provide practical and reliable wear resisting strips for an endless conveyor assembly, and ones which are exceedingly effective for the purpose for which they are designed.

These objects are accomplished by means of such structure and relative arrangement of parts as will fully appear by a perusal of the following specification and claims.

In the drawings:

Fig. 1 is a transverse sectional elevation of an endless belt conveyor assembly embodying the present invention.

Fig. 2 is a fragmentary longitudinal sectional elevation taken on line 2—2 of Fig. 1.

Fig. 3 is a fragmentary side elevtaion, on reduced scale, of the endless belt conveyor assembly shown in Fig. 1.

Fig. 4 is a top plan view, foreshortened, of one of the wear resisting strips.

Referring now more particularly to the characters of reference on the drawings, the present invention is embodied in an endless belt conveyor assembly of the type which includes an endless rubber belt, indicated generally at 1; the latter having an upper run 2 and a lower run 3.

The endless belt 1 is supported, for travel, in a longitudinally extending conveyor frame, indicated generally at 4, which frame includes side beams 5, each having a top flange 6.

At opposite ends of the conveyor frame 4 the endless belt 1 is trained about drums 7, one of which is driven in the customary manner.

Intermediate the ends of the frame 4 the endless belt 1 is carried by sets of intermediate rollers 8 disposed between the runs 2 and 3; each set of such rollers 8 being journaled on a cross shaft 9 mounted at the ends in connection with the side beams 5.

At spaced points in the length thereof the endless belt 1 is fitted with cross cleats 10; such cross cleats 10 being of lesser length than the width of the belt 1 whereby such belt has unobstructed longitudinal side edge portions, indicated at 11. These side edge portions 11, in the upper run, are supported by and travel on the flanges 6.

Above the side edge portions 11 in the upper run 2 of belt 1, the conveyor assembly includes longitudinal or full length side skirts 12; such side skirts 12 being of rubber.

The longitudinal side skirts 12 extend in the main in upwardly and outwardly diverging relation to form, in effect, trough sides in the conveyor assembly; such side skirts 12 being supported, adjacent the top and on the back side, by longitudinal backing strips 13. The side skirts 12 are attached to the backing strips 13 by bolts 14, and in turn the backing strips 13 are supported from the related top flange 6 by means of upstanding, longitudinally spaced attachment brackets 15 fixed on each of said top flanges 6. Additionally, the bolts 14 serve to retain longitudinal side or trough plates 16 which continue upwardly from the side skirts 12 with the same divergence.

At their lower longitudinal edges the rubber side skirts 12 are bent inwardly to form, on each, a longitudinal foot 17 which heretofore rested in direct frictional contact with the side edge portions 11 of the upper run 2. It was this direct frictional contact which caused undue wear of the side skirts 12 on the side edge portions 11 of the belt 1, greatly shortening the life of the latter, especially under working conditions where the conveyed material was highly abrasive.

To avoid such undesirable result the present invention contemplates the interposition of a longitudinal or full length, flat metallic strip 18— preferably of steel—between each side edge portion 11 of the upper run 2 and the adjacent longitudinal foot 13 of the corresponding side skirt 12.

These metallic strips 18 are held stationary so that the only relative movement is between the side portions 11 of upper run 2 and said strips. In other words, the relatively narrow longitudinal feet 17 are in stationary relation to the strips 18.

Each of the strips 18 is maintained in place by the following connecting means:

In the length thereof, each of the strips 18 is formed—in spaced relation—with initially U-shaped, laterally outwardly opening attachment clips, each of which is indicated generally at 19, with the legs identified at 20.

The spacing of the attachment clips 19 on each strip 18 is the same as the upstanding brackets 15 on each flange 6. As a consequence the clips 19 straddle the brackets 15 when each strip 18 is placed in its working position on one of the side edge portions 11 and beneath the corresponding side skirt 12.

After the clips 19 straddle the brackets 15, the free ends of the legs 20 are bent about the back side of said brackets 15, as shown at 21. Although the legs 20 are bent about the brackets 15, as above, there is no tight connection, and said clips and the strip 18 are free to float up and down; this assuring that each strip 18 maintains direct flush engagement atop the upper run of the conveyor belt. In order to avoid any possibility of the ends of each conveyor strip 18 from digging into the belt 1, such ends are turned up and coiled, as at 22.

With the described invention the longitudinal side skirts 12 continue to function in hold-down relation to the upper run 2, as well as forming trough sides on the conveyor assembly, but the undesirable wear between such side skirts 12 and the endless belt is avoided.

While the upper run 2 of the belt 1 does travel relative to the stationary metallic strips 18, the area of contact is sufficiently large so that wear on the belt is an incidental factor. To attain such substantial area of contact, it is desirable that the strips 18 be of a width substantially the same as the width of the side edge portions 11 on the belt 1.

It should also be noted that the present invention is adaptable with equal effectiveness to endless belt conveyor assemblies of straight type, or of curved type—i. e. where the upper run traverses a longitudinally arcuate path.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful and upon which Letters Patent is desired:

1. In an endless belt conveyor assembly, an endless belt of flexible material, a relatively stationary longitudinal wear resisting strip normally resting on and extending along the top surface of each side edge portion of the upper run of the belt, and a stationary longitudinal side skirt bearing at the lower edge atop each strip and thence extending upwardly therefrom.

2. In an endless belt conveyor assembly, an endless belt of flexible material, a flat longitudinal wear resisting strip of metal disposed on and extending along the top surface of each side edge portion of the upper run of the belt, means securing each strip against longitudinal displacement, and a stationary longitudinal side skirt of flexible material bearing at the lower edge atop each strip and thence extending upwardly therefrom.

3. In an endless belt conveyor assembly, an endless belt of flexible material, a flat longitudinal wear resisting strip of metal disposed on and extending along the top surface of each side edge portion of the upper run of the belt, means securing each strip against longitudinal displacement, and a stationary longitudinal side skirt of flexible material bearing at the lower edge atop each strip and thence extending upwardly therefrom; the conveyor assembly including longitudinal members on which said side edge portions of the upper run are supported for travel, longitudinally spaced brackets upstanding from said members laterally outward from said upper run, and connecting means between each strip and adjacent brackets.

4. A structure, as in claim 3, in which said connecting means comprises clips on each strip projecting laterally toward and engaging the brackets.

5. A structure, as in claim 4, in which each clip is initially of U-shape and opens outwardly to receive the corresponding bracket between the legs of said clip; said legs then being bent about said bracket.

6. In an endless belt conveyor assembly, an endless belt of flexible material, a relatively stationary longitudinal wear resisting strip normally resting on and extending along the top surface of each side edge portion of the upper run of the belt, a stationary longitudinal side skirt bearing at the lower edge atop each strip and thence extending upwardly therefrom, each strip being of metal, and upturned end portions on the strips to provide against belt damage from the ends of the strips.

References Cited in the file of this patent

UNITED STATES PATENTS

| Number | Name | Date |
|---|---|---|
| 1,021,463 | Jackson | Mar. 26, 1912 |
| 1,826,379 | Birkmeyer et al. | Oct. 6, 1931 |

FOREIGN PATENTS

| Number | Country | Date |
|---|---|---|
| 296,845 | Great Britain | Sept. 13, 1928 |